US006823713B2

(12) United States Patent
Shuman

(10) Patent No.: US 6,823,713 B2
(45) Date of Patent: Nov. 30, 2004

(54) SCANNING TIP ORIENTATION ADJUSTMENT METHOD FOR ATOMIC FORCE MICROSCOPY

(75) Inventor: David James Shuman, Wappingers Falls, NY (US)

(73) Assignee: Infineon Technologies AG, Munich (DE)

(*) Notice: Subject to any disclaimer, the term of this patent is extended or adjusted under 35 U.S.C. 154(b) by 1 day.

(21) Appl. No.: 10/411,728

(22) Filed: Apr. 11, 2003

(65) Prior Publication Data

US 2004/0200261 A1 Oct. 14, 2004

(51) Int. Cl.[7] .............................................. H01L 21/20
(52) U.S. Cl. ...................................................... 73/1.81
(58) Field of Search ................................ 73/1.79, 1.81, 73/1.75, 105; 250/306, 307, 252.1

(56) References Cited

U.S. PATENT DOCUMENTS 5,578,745 A * 11/1996 Bayer et al. ................. 73/1.73

* cited by examiner

Primary Examiner—Robert Raevis
(74) Attorney, Agent, or Firm—Slater & Matsil, L.L.P.

(57) ABSTRACT

A method of calibrating an AFM scanner head of an AFM machine to determine the arc functions of the scanner head are provided. A method of measuring the actual orientation of an AFM tip in conjunction with the arc functions provides a way to know and control the actual AFM tip orientation for performing better AFM scans, obtaining more accurate depth measurements into a deep feature, and obtaining better portrayals of specific portions of a deep feature in AFM images. AFM images focusing on portraying specific portions of a deep feature structure may be combined to form a composite image of a representative deep feature for a sample.

8 Claims, 15 Drawing Sheets

SCANNING TIP ORIENTATION ADJUSTMENT METHOD FOR ATOMIC FORCE MICROSCOPY

CROSS-REFERENCE TO RELATED APPLICATION

This application is related to the following co-pending and commonly assigned U.S. patent application, which is hereby incorporated herein by reference: Ser. No. 10/218, 449, filed Aug. 13, 2002, entitled ATOMIC FORCE MICROSCOPY SCANNING METHODS.

TECHNICAL FIELD

The present invention relates to atomic force microscopy, and more particularly to atomic force microscopy scanning methods for tip orientation determination and adjustment.

BACKGROUND OF THE INVENTION

Atomic force microscopy (AFM) probes are often used to evaluate and measure features on a semiconductor product as the semiconductor product is being developed or fabricated into an integrated circuit device, for example. Conventional AFM probes typically include a silicon cantilever beam with a silicon tip ("AFM tip") extending perpendicular to or at a slight angle (e.g., 10 degrees) relative to the cantilever beam. The AFM tip is often formed into a long and thin rod. The AFM tip is often etched to form a sharp apex small enough to fit into a deep feature. There are several high aspect ratio tips on the market made for imaging and measuring deep narrow features. Some high aspect ratio tips are made using a focused ion beam to machine the silicon tip into a long thin rod with an aspect ratio between about 7:1 and 10:1. Hence, an AFM tip with a 10:1 aspect ratio (i.e., length:diameter) may be able to reach 1000 nm into a 100 nm diameter trench. Other high aspect ratio tips may be formed using electron beam deposition (e.g., EBD tips) or may be carbon nanotubes with a diameter between about 10 nm and 80 nm, for example.

As technology progresses, the features of integrated circuits typically become smaller, and in some cases, deeper. Thus, the demands on the size and precision of movement of AFM probe tips tends to increase as well. The depth that an AFM tip can reach into a deep feature depends on the angle or orientation of the tip relative to the deep feature sidewalls. If the center line of the AFM tip is perpendicular to the wafer surface or parallel to the deep feature sidewalls, then the AFM tip can reach deepest a center region of the deep region. If a left side or left face of the AFM tip is parallel with or inverted relative to a left sidewall of the deep feature, then the AFM tip can reach deepest at a left side of the deep feature along its left sidewall. Such scan may be desirable to obtain an AFM image of the left sidewall or to measure the depth of the deep feature at the bottom left corner. However, without knowing the actual AFM tip orientation and without being able to control the actual tip orientation, the AFM image results may be misleading. Due to the size of the deep features being measured for semiconductor devices relative to the size of the AFM tip, the actual AFM tip orientation must be known and controlled to obtain accurate AFM images of the deep features. Hence, there is a need for a way to measure, adjust, and control the actual AFM tip orientation for a given scanner head and AFM tip setup.

SUMMARY OF THE INVENTION

The problems and needs outlined above are addressed by embodiments of the present invention. In accordance with one aspect of the present invention, a method of calibrating a scanner head of an atomic force microscopy (AFM) machine is provided. The method includes the following steps, the order of which may vary. First, a calibration sample is loaded into the AFM machine. Second, deep features formed in the sample are scanned along a first line in a first direction with an AFM tip that is attached to the scanner head. Third, a first tip angle measurement is determined for the AFM tip relative to the sample along the first line for at least two of the deep features scanned along the first line. Fourth, deep features formed in the sample are scanned along a second line in a second direction with the AFM tip. The second direction differs from the first direction. Fifth, a second tip angle measurement is determined for the AFM tip relative to the sample along the second line for at least two of the deep features scanned along the second line. Sixth, a first function is determined which corresponds to the first tip angle measurements versus position along the first line. Seventh, a second function is determined which corresponds to the second tip angle measurements versus position along the second line. Eighth, the first and second functions are stored as the arc functions for the scanner head.

In accordance with another aspect of the present invention, a method of measuring an actual tip angle for an AFM tip is provided. This method includes the following steps, the order of which may vary. First, a sample having at least one deep feature formed therein is provided. The deep feature has vertical sidewalls. Second, the deep feature is scanned with the AFM tip. Third, a cross-section image of deep feature scan data is analyzed to determine a slope of a left sidewall of the cross-section AFM image. Fourth, the cross-section image of deep feature scan data is analyzed to determine a slope of a right sidewall of the cross-section image. Fifth, the actual tip angle of the AFM tip is determined at a position where the deep feature was scanned based on the left and right sidewall slopes.

In accordance with yet another aspect of the present invention, a method of calibrating an AFM tip is provided. This method includes the following steps, the order of which may vary. First, a calibration sample is loaded into an AFM machine. The sample has deep features formed therein. Second, a scanner head is moved to an initial position. The AFM tip is attached to the end of the scanner head. Third, one of the deep features is scanned at the initial position. Fourth, a first tip angle measurement is determined for the AFM tip relative to the sample in a first direction. Fifth, a second tip angle measurement is determined for the AFM tip relative to the sample in a second direction. The second direction differs from the first direction. Sixth, a first position offset in the first direction is determined for performing a first scan. Seventh, a second position offset in the second direction is determined for performing the first scan. The first scan may be a center scan for scanning a central portion of one of the deep features so that the first and second position offsets correspond to a position coordinate where the AFM tip is substantially perpendicular to a surface of the sample in both the first and second directions. The first scan may be a left scan for scanning a left side portion of one of the deep features so that the first and second position offsets correspond to a position coordinate where a left face of the AFM tip is substantially perpendicular to a surface of the sample in the first direction. And, the first scan may be a right scan for scanning a right side portion of one of the deep features so that the first and second position offsets correspond to a position coordinate where a right face of the AFM tip is substantially parallel with a right sidewall of the deep feature to be scanned for the first scan. The first position offset may be verified (if needed or desired) by performing a test scan and measuring the tip angle with the scanner head at the first position offset.

In accordance with yet another aspect of the present invention, a method of obtaining a partial deep feature AFM image is provided. This method includes the following steps, the order of which may vary. First, a sample is loaded into an AFM scanner machine. The sample has deep features formed therein, and the AFM scanner machine has a scanner head with an AFM tip attached thereto. Second, a desired deep feature image portion to be scanned is selected from choices including a center portion, a left portion, and a right portion. Third, if the center portion is selected for the deep feature image portion desired, the scanner head is moved to a first position where the AFM tip is substantially perpendicular to a surface of the sample. If the left portion is selected for the deep feature image portion desired, the scanner head is moved to a second position where a left face of the AFM tip will be substantially parallel with a left sidewall of one of the deep features at the second position. If the right portion is selected for the deep feature image portion desired, the scanner head is moved to a third position where a right face of the AFM tip will be substantially parallel with a right sidewall of one of the deep features at the third position. Fourth, one of the deep features is scanned at the current scanner head position corresponding to the selected portion to obtain a cross-section AFM image of the deep feature focusing on the selected portion. The AFM image may be analyzed to obtain a depth measurement for the selected portion of the deep feature scanned.

In accordance with a further aspect of the present invention, a method of obtaining a composite deep feature AFM image is provided. This method includes the following steps, the order of which may vary. First, a sample is loaded into an AFM scanner machine. The sample has deep features formed therein. The AFM scanner machine has a scanner head with an AFM tip attached thereto. Second, the scanner head is moved to a first position where the AFM tip is substantially perpendicular to a surface of the sample. Third, a first deep feature at the first position is scanned to obtain a first cross-section AFM image of the first deep feature focusing on a center portion of the first deep feature. Fourth, the scanner head is moved to a second position where a left face of the AFM tip will be substantially parallel with a left sidewall of a second deep feature at the second position. Fifth, the second deep feature at the second position is scanned to obtain a second cross-section AFM image of the second deep feature focusing on a left portion of the second deep feature. Sixth, the scanner head is moved to a third position where a right face of the AFM tip will be substantially parallel with a right sidewall of a third deep feature at the third position. Seventh, the third deep feature at the third position is scanned to obtain a third cross-section AFM image of the third deep feature focusing on a right portion of the third deep feature. Eighth, the center portion of the first image is combined with the left portion of the second image and with the right portion of the third image to form the composite AFM image.

The foregoing has outlined rather broadly the features of the present invention so that the detailed description of the invention that follows may be better understood. Additional features and advantages of the invention will be described hereinafter which form the subject of the claims of the invention. It should be appreciated by those of ordinary skill in the art that the conception and specific embodiment disclosed may be readily utilized as a basis for modifying or designing other structures or processes for carrying out the same purposes of the present invention. It should also be realized by those of ordinary skill in the art that such equivalent constructions do not depart from the spirit and scope of the invention as set forth in the appended claims.

BRIEF DESCRIPTION OF THE DRAWINGS

The above features of the present invention will be more clearly understood from consideration of the following description in connection with accompanying drawings, in which:

FIG. 1b is an enlarged side view focusing on the scanner head portion of FIG. 1a;

FIG. 4b is a resulting AFM image from the AFM scan of FIG. 4a;

FIG. 5b is a resulting AFM image from the AFM scan of FIG. 5a;

FIG. 6b is a resulting AFM image from the AFM scan of FIG. 6a;

FIG. 13b is a side view of a tip shape image derived from the AFM image of FIG. 13a;

DETAILED DESCRIPTION OF PREFERRED EMBODIMENTS

The methods of using the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Generally, an embodiment of the present invention provides a method of adjusting the orientation of an AFM tip for use in atomic force microscopy ("AFM" hereinafter), which is useful in evaluating deep features of a semiconductor products, for example. A preferred embodiment of the present invention and its advantages will be next described.

Figure 1A:
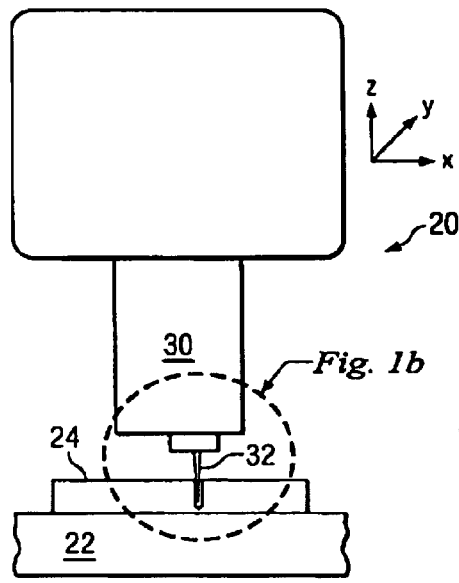
FIG. 1a is a side view of a typical AFM scanner machine.

FIG. 1a is a side view of an AFM scanner machine 20. The AFM machine 20 has a stage head 22 for holding a test sample 24 (e.g., a wafer having deep features formed therein). A typical stage head 22 can be moved in macro increments of about 5 microns using stepper motors (not shown). The AFM machine 20 also has a piezoelectric scanner head 30. In some AFM machines, the scanner head 30 also can be moved in macro increments of about 5 microns using stepper motors.

Figure 1B:
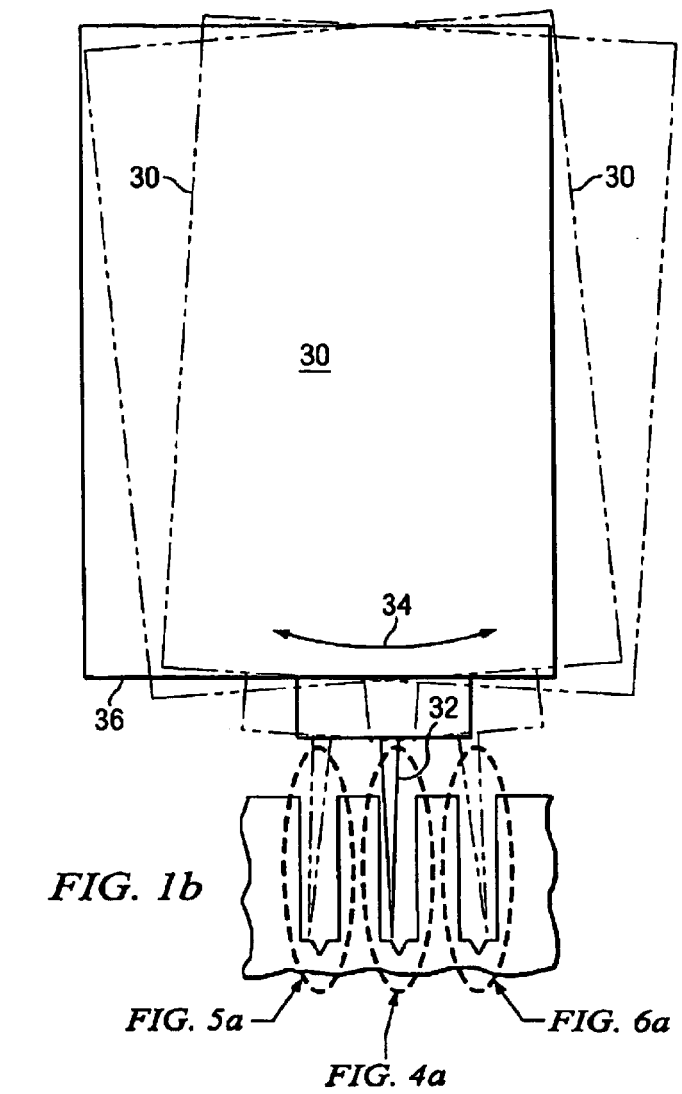

The piezoelectric scanner head 30 is adapted to hold an AFM tip 32, as shown in FIG. 1b. FIG. 1b is an enlarged view of the scanner head portion 30 in FIG. 1a. The piezoelectric scanner head 30 provides micro movements of the AFM tip for scanning with precision in the nanometer range with the AFM tip 32.

For sake of discussion and as a point of reference, a three axis Cartesian coordinate system is used to describe the position of the AFM tip 32, as shown in FIG. 1a. The x-y plane corresponds with the surface plane of the stage head 22 or of a wafer 24 placed flat on the stage head 22 (as shown in FIG. 1a). The z axis extends perpendicular to the x-y plane (i.e., perpendicular to a wafer surface plane).

Figure 2:
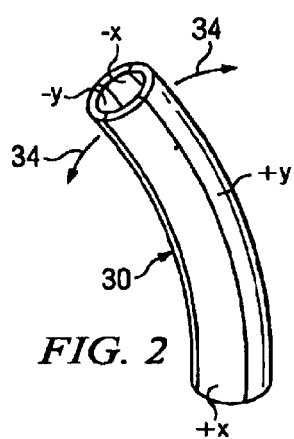
FIG. 2 is a perspective view of a bending piezoelectric scanner head.
Figure 3:
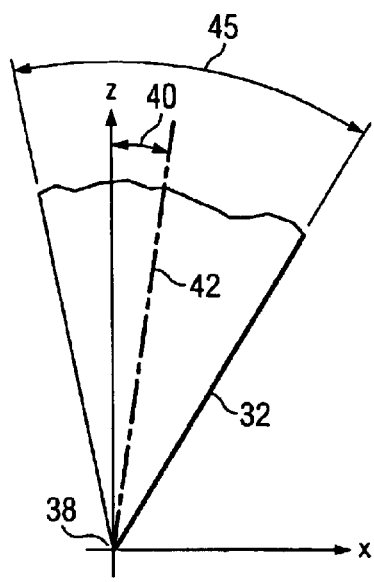
FIG. 3 is an enlarged side view schematic of an AFM tip relative to a Cartesian coordinate

FIG. 2 shows a typical piezoelectric scanner head 30 to illustrate how it moves in the x and y directions. Referring to FIGS. 1b and 2, many piezoelectric scanner heads also have the ability to move longitudinally in the z direction. One thing to note about the piezoelectric scanner head 30 is that its end moves in an arc 34 when actuated in the x or y directions. A z direction movement may be used to compensate for the change in z position as the scanner head 30 is moved in the x or y directions. However, such z movement compensation does not affect the tilt experienced by the end 36 of the scanner head 30 when moved in the x or y directions. Thus, even though the AFM tip apex 38 may be at a desired position in the x-y-z coordinates, it may be tilted. The angle of the tip (i.e., tip angle 40) is defined as the angle 40 between a central longitudinal axis 42 of the AFM tip 32 and the z axis, in either the x or y directions, as shown in FIG. 3.

Figure 4A:
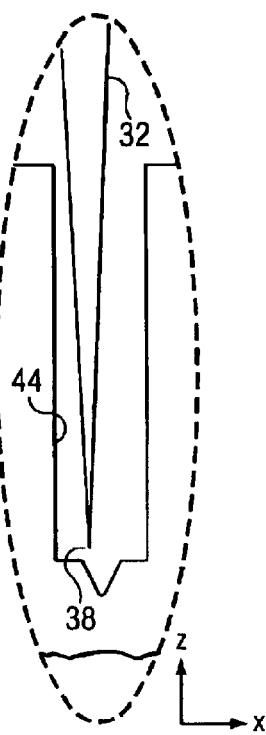
FIG. 4a is a cross-section view of a deep feature being scanned by a vertically oriented

Referring now to FIG. 4a, if a deep feature 44 scanned is not much larger than the AFM tip 32 used to scan it, knowledge and control of the tip angle 40 is critical for obtaining meaningful and accurate AFM images. As shown in a top view in FIG. 11a, a deep trench 44 found in a semiconductor device may have an oval opening with a length of 110 nm and a width of 90 nm, for example. In comparison, a typical AFM tip 32 may have a diameter of about 60 nm at a distance from the tip of about 600 nm so that in this region the aspect ratio of the tip is about 10:1 (length:width). When the same deep feature 44 is scanned using the same AFM tip 32, but with different tip angles 40, the resulting AFM image will look different for each tip angle 40. Because the size of the AFM tip 32 is not much smaller than the size of the typical deep features 44 found in today's semiconductor devices during manufacturing, the ability of the AFM tip 32 to reach and thus scan each portion of the deep feature 44 is often limited by the slope of the AFM tip point 38 (i.e., AFM tip apex angle 45 shown in FIG. 3) or the length-to-width aspect ratio of the AFM tip 32.

Figure 4B:
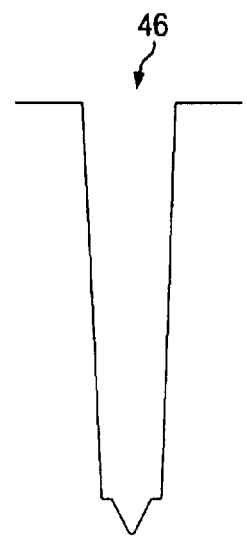
Figure 5A:
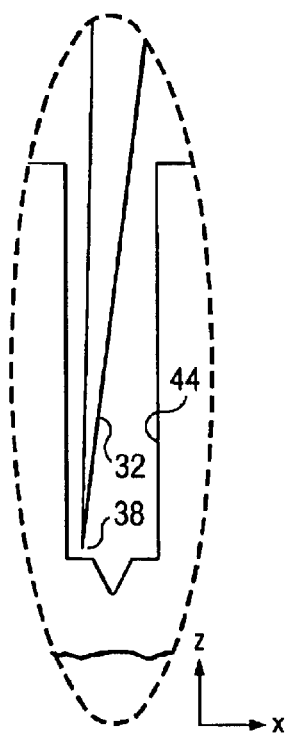
FIG. 5a is a cross-section view of a deep feature being scanned by a left-tilted AFM tip.
Figure 5B:
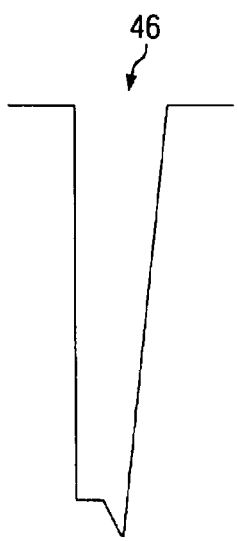
Figure 6A:
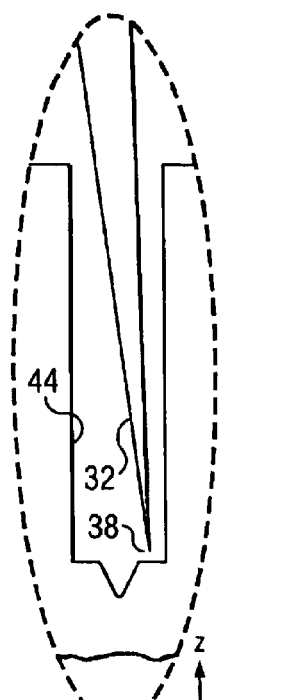
FIG. 6a is a cross-section view of a deep feature being scanned by a right-tilted AFM tip.
Figure 6B:
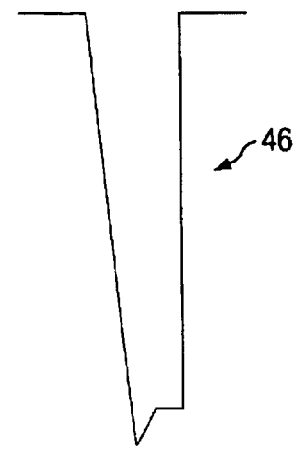

FIGS. 4a-6c illustrate an AFM tip 32 scanning a deep trench 44 with the AFM tip 32 at different tip angles 40 (FIGS. 4a, 5a, and 6a) and the resulting AFM images 46 after scanning the deep trench 44 with different tip angles 40 (FIGS. 4b, 5b, and 6b). In FIGS. 4a, 5a, and 6a, the trenches 44 are shown as a cross-section taken along the x axis so that the x-z plane is shown. The scans are performed using a so called tapping mode (a.k.a. dipping mode) with the AFM tip 32 traversing along the x axis while following the profile of the deep trench 44 in the z direction. However, other modes of sensing (other than a tapping mode or in combination with a tapping mode) may be used in an embodiment of the present invention as well, including (but not limited to: non-contact mode, contact mode, tapping mode, dipping mode, dynamic force mode, intermittent-contact mode, Vander Walls force sensing, repulsive regime force sensing, attractive regime force sensing, near contact mode, lateral force sensing, torsional force sensing, friction force sensing, current imaging mode, force modulation, frequency modulation, phase imaging, oscillatory mode, or any combination thereof, for example.

In FIG. 4a, the AFM tip 32 is substantially perpendicular with the x-z plane and the tip angle 40 is about zero degrees. With this tip angle (zero), the AFM tip 32 can reach its deepest into the trench 44 at the trench center portion. FIG. 4b is the AFM image 46 produced with the AFM tip 32 oriented upright. Note in FIG. 4b that the AFM image 46 shows the sidewalls of the trench as sloped rather than vertical. Due to the slope of the AFM tip sides, the apex 38 of the AFM tip 32 cannot trace the vertical sidewalls at this orientation (see FIG. 4a). Thus, the scan of FIG. 4a focuses on the central portion of deep trench 44 and only accurately portrays the central portion in the AFM image 46 (see FIG. 4b).

In FIG. 5a, the AFM tip 32 is tilted to the left so that the left side of the AFM tip 32 is vertical (i.e., parallel with the left face of the trench, parallel with the z axis in the x direction, and perpendicular to the wafer surface (x-y plane)). In general, to enable the apex 38 of a pointed AFM tip 32 to trace the left side wall of the trench 44, the AFM tip 32 must be tilted so that the left side of the AFM tip 32 is parallel with or inverted relative to the left sidewall of the trench 44. FIG. 5b illustrates the AFM image 46 produced by the scan of FIG. 5a having the AFM tip 32 tilted to the left. Notice in FIG. 5b that the left side of the AFM image 46 provides an accurate portrayal of the actual trench profile. However, the right side of the AFM image 46 does not resemble the actual trench profile. Thus, the scan in FIG. 5a focuses on a left portion of deep trench 44. Similarly, FIG. 6a shows the AFM tip 32 tilted to the right, which provides an accurate scan of the right side of the trench 44 but not an accurate portrayal of the left side. Also, note that with the AFM tip 32 tilted (FIGS. 5a and 6a), the center divot is not fully scanned or imaged. Therefore, as illustrated in FIGS. 4a–6c, the orientation of the AFM tip 32 (i.e., the tip angle 40) is an important parameter to know and control if an accurate and knowledgeable scan is to be performed A preferred embodiment of the present invention provides a way to measure and know the actual tip orientation, as well as a way to estimate what the tip angle 40 will be for certain movements of a given scanner head 30. With such information and using a preferred embodiment of the invention, the actual tip angle 40 can be known and controlled so that the results of an AFM scan can be more accurate and controlled to provide the desired resulting image. Hence, if a user wants to scan along a left sidewall of a deep feature 44 to measure the depth of the deep feature 44 at the bottom left corner, the user can know, control, and set the AFM tip position so that the AFM tip 32 will be oriented at the best tip angle 40 for making such a scan. Also, a preferred embodiment may be used to calibrate a scanner head 30 and an AFM tip 32.

Figure 7:
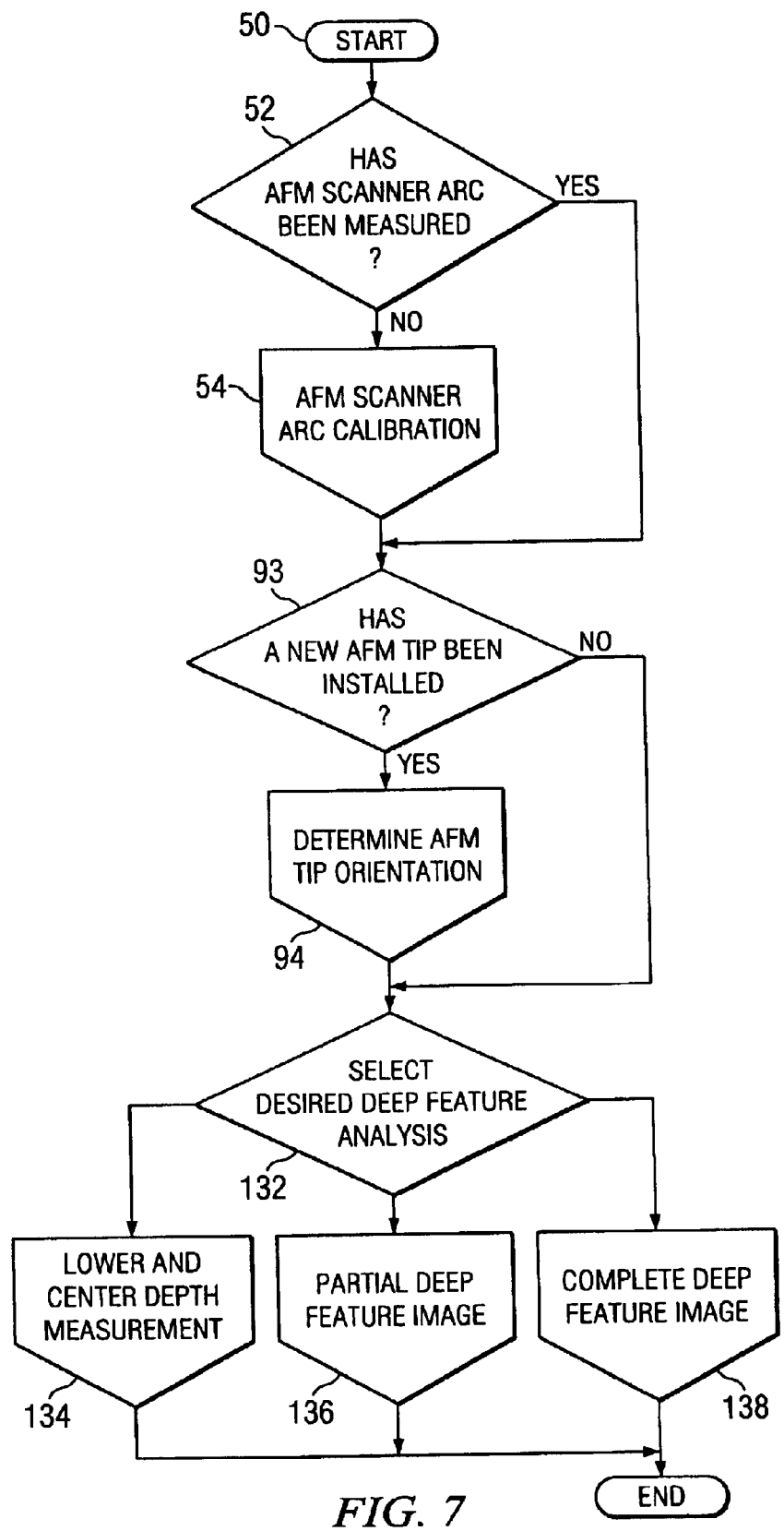
FIG. 7 is a flowchart for main process of a preferred embodiment of the present invention.

FIGS. 7, 8, 12, and 16–24 are flowcharts illustrating the scanning and calibration methods of a preferred embodiment. Such preferred embodiment may be incorporated into a computer program adapted to execute on a computer system, which controls the movement of an AFM scanner head 30 and the AFM tip 32. Such computer system may be used as part of a commercially available AFM testing machine 20, for example. Hence, the flowcharts of FIGS. 7, 8, 12, and 16–24 (discussed further below) may be considered pseudo code for the computer program. The particular computer language used to implement the logic and instructions shown in FIGS. 7, 8, 12, and 16–24 may vary, depending on a programmer's preference and/or depending on the computing device of an embodiment. FIG. 7 illustrates a main program or the main procedure. FIGS. 8, 12, and 16–24 illustrate subroutines (or other procedures) called upon by the main program. On the other band, the methods of the preferred embodiment illustrated by the flowcharts in FIGS. 7, 8, 12, and 16–24 may simply be a testing procedure carried out in part manually or semi-automatedly for use of such preferred embodiment.

As an example embodiment, this preferred embodiment is discussed in context of it being implemented as a software program used in conjunction with an AFM machine 20 (e.g., as shown in FIG. 1a). Preferably, the software program will provide a graphical user interface (not shown) on a display (not shown) connected with the AFM machine 20 for communicating with a user as needed. Beginning in FIG. 7 at the start terminal 50 and proceeding to the first decision block 52, it is first determined whether the AFM scanner arc functions have been measured for the current scanner head (decision block 52). Decision block 52 is inquiring whether the scanner head has been calibrated to know the mathematical functions representing an approximation of the movement path of the end 36 of the scanner head 30 and the AFM tip 32 along its natural arc 34 as the scanner head 30 is actuated in the x and/or y directions. The scanner head only needs to be calibrated once (or periodically over long periods of time if needed) because the arc functions obtained from the calibration procedure should remain the same for that scanner head throughout all or most of its useful life. In many AFM machines, the scanner head may be changed or replaced. Thus, the calibration procedure to determine the arc functions of the scanner head will need to be performed if the scanner head is replaced with a new one. Also, the calibration procedure may need to be repeated if the same scanner head is removed (i.e., for service or cleaning) and reinstalled.

Because the scanner head is not often changed or removed, it is preferable to have the default answer for decision block 52 set to NO. In such case, the user may be required to tell the software program that the scanner head needs calibration without being prompted. A sensor for detecting whether the scanner head has been removed may be incorporated into the AFM machine to detect this automatically.

Figure 11A:
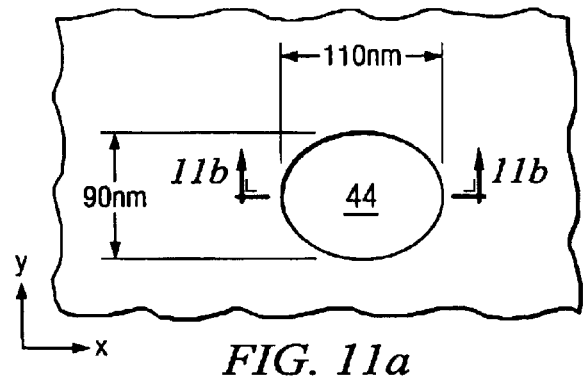
FIG. 11a is a top view of one of the deep features from the calibration sample of FIG. 10.
Figure 11B:
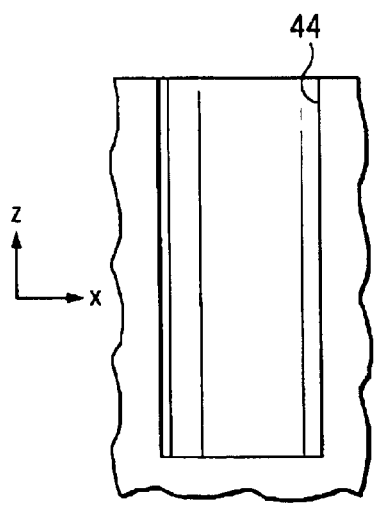
FIG. 11b is a cross-section view of the deep feature of FIG. 11a as taken along line 11b—11b.
Figure 8:
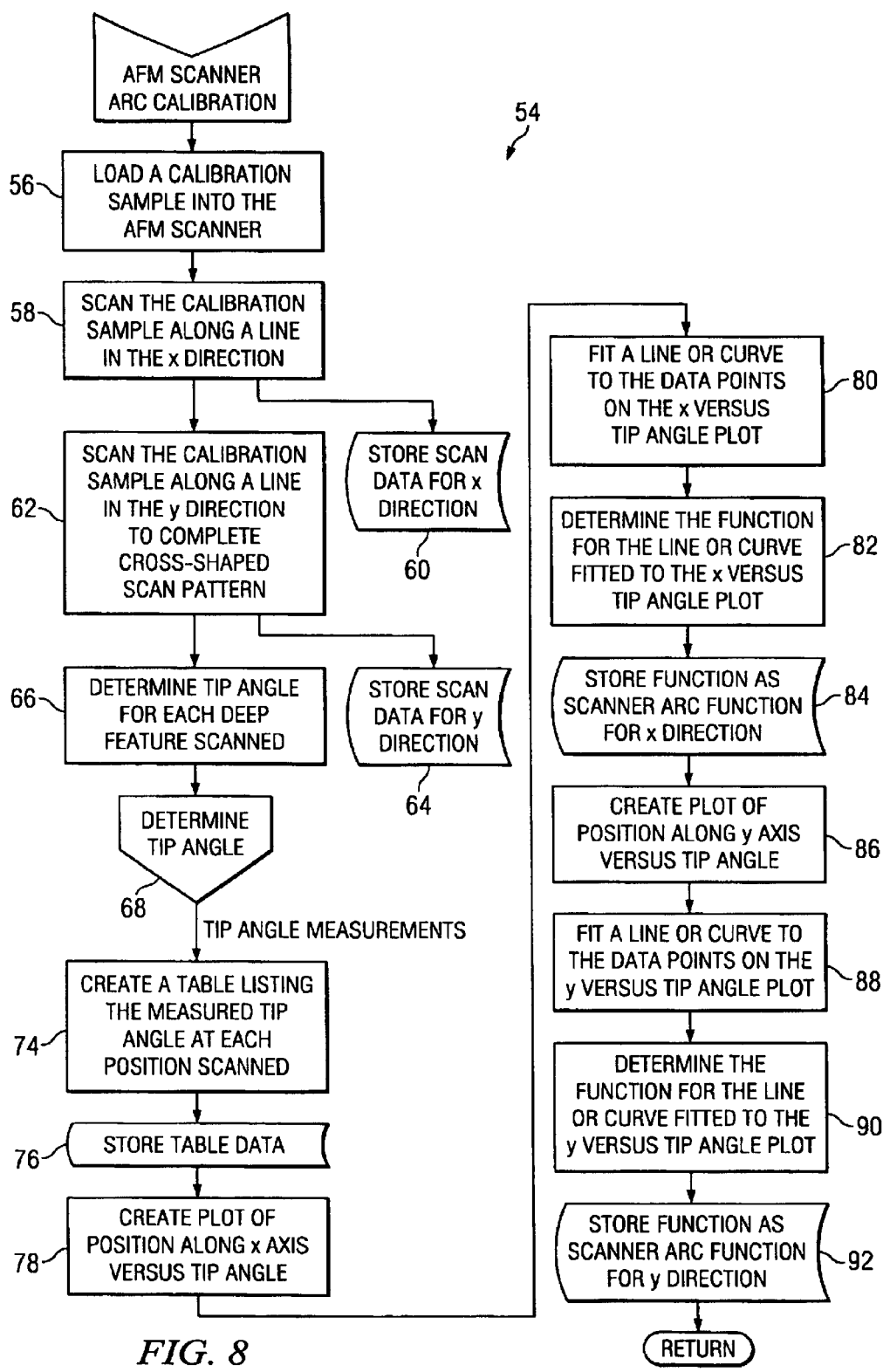
FIG. 8 is a flowchart for a process of calibrating an AFM scanner head.
Figure 9:
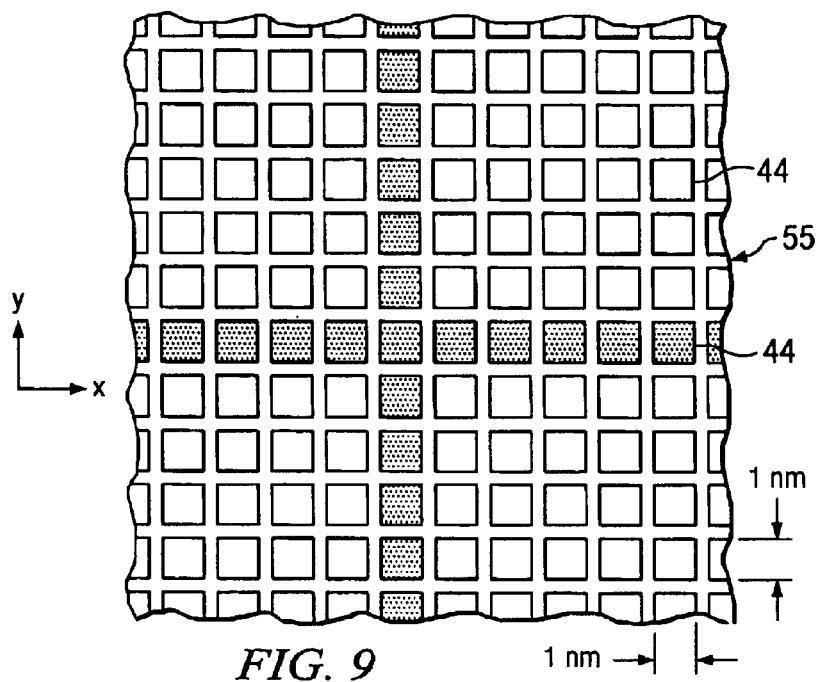
FIG. 9 is a partial top view of a calibration sample having an array of square-shaped deep of known size and shape.

If the scanner arc 34 has not been measured (or if it needs to be re-measured or re-calibrated), then the AFM scanner arc calibration procedure is called upon (block 54) and performed. A flowchart 54 for the AFM scanner arc calibration procedure is shown in FIG. 8. First, a calibration sample is loaded into the AFM scanner machine (action block 56). There are many different calibration samples that may be used for this procedure. Preferably, the calibration sample has a grid of identical deep features of known dimensions and known shapes, each deep feature having vertical sidewall (i.e., sidewalls aligned with or parallel with the z axis). For example, as shown in FIG. 9, the calibration sample 55 may be a copper layer having a grid of deep features 44 formed therein, where each deep feature 44 has a one micron by one micron square shaped opening (in x-y plane), vertical sidewalls, and a flat bottom. As another example, shown in FIG. 10, the calibration sample 55 may be a silicon wafer having deep features 44 formed therein, where each deep feature 44 has an oval opening, an opening width of about 110 nm in the x direction, an opening height of about 90 nm in the y direction, and vertical sidewalls. An enlarged image of one of the deep features 44 of FIG. 10 is shown in FIG. 11a, and FIG. 11b shows a cross-section profile of the deep feature 44 of FIG. 11a.

It is possible to scan every deep feature 44 on the sample 55 and use the resulting data to determine the arc functions for the scanner head movement, but to do so would be very time consuming and is probably not necessary. Hence, the preferred and more practical approach is to scan along a line in the x direction and in a line along y direction. The length of the scan (i.e., scan range along the line in the x direction) may be varied. Experimental tests have shown that scanning about 10 microns in each direction provides sufficient data to derive the arc functions. Even smaller scan lengths (e.g., 1 micron) may be used if the deep features 44 are smaller (as in FIG. 10) or if time pressures require it. Preferably a cross-shaped scan pattern is performed with the scanner position setting of (x=0, y=0) at the center of the cross-shaped pattern. In FIGS. 9 and 10, certain deep features 44 are shaded to illustrate the cross-shaped scan pattern. It is preferred to center the cross-shaped scan pattern about the (0,0) position of the scanner head because the (0,0) position of the scanner head will likely be close to or at the actual scanner position needed to get desired tip angles (e.g., having the tip angle=0 for a center depth scan), for example.

Figure 10:
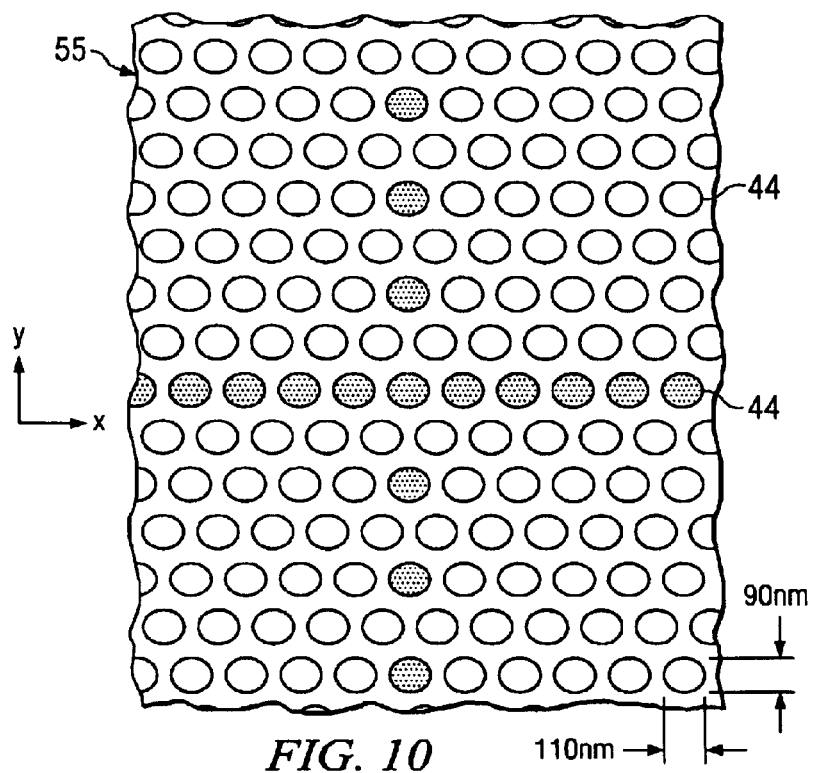
FIG. 10 is a partial top view of a calibration sample having an array of oval-shaped deep of known size and shape.

Continuing with the flowchart 54 of FIG. 8, then the next step is to perform an AFM scan (e.g., tapping/dipping mode) along a line in the x direction (action block 58), as illustrated by the shaded deep features in FIGS. 9 and 10. The AFM scanning is performed with the AFM tip traversing along the x direction while the AFM tip follows the contour or cross-section profiles (see e.g., FIG. 11b) of the deep features in the z direction. As the scan is performed, the data is stored for later use (block 60). Next, an AFM scan is performed along the y direction to complete the cross-shaped scan pattern (action block 62) (see cross-shaped pattern in FIGS. 9 and 10), and the scan data is stored for future use (block 64). Using the scan data, the tip angle 40 for the AFM tip 32 is determined for each deep feature 44 scanned (action block 66) in both the x direction and y direction.

Figure 12:
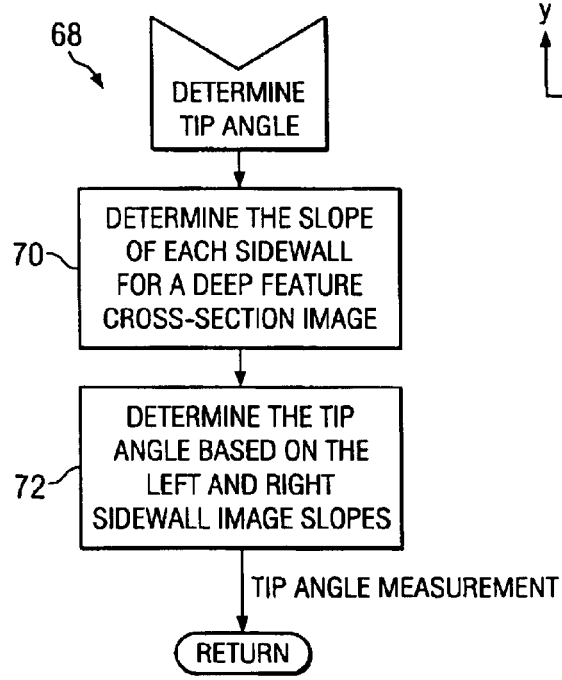
FIG. 12 is a flowchart for a process of determining a current tip angle.
Figure 13A:
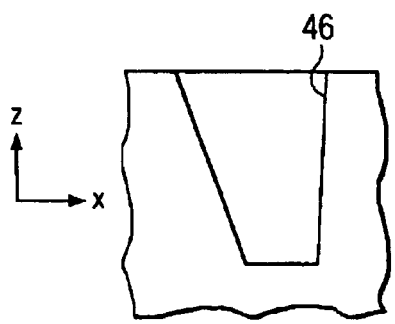
FIG. 13a is a cross-section AFM image from a scan of the deep feature of FIGS. 11a and 11b.
Figure 13B:
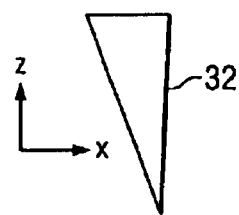

An example of the subroutine 68 that may be used to determine the tip angle 40 is illustrated in flowchart 68 in FIG. 12. Also, FIGS. 13a and 13b describe the process of determining the tip angle. FIG. 13a shows an example cross-section image 46 of one of the deep features 44 scanned when the AFM tip 32 is tilted to the right. Hence, FIG. 13a is an AFM image 46 portraying the actual deep feature cross-section 44 shown in FIG. 11b. Note that in FIG. 13a, the sidewalls of the deep feature in the AFM image 46 are not vertical, but are sloped. The slopes of the sidewalls in the AFM image 46 directly correspond to the slopes of the actual AFM tip shape, as illustrated in FIG. 13b. Thus, at action block 70 in FIG. 12, determining the slopes of the AFM image sidewalls will provide the actual slope of the AFM tip 32 at this scanner head position, as illustrated in FIGS. 13a and 13b. Based on the slopes of the AFM tip shape relative to the cartesian coordinate system, the tip angle 40 can be calculated (action block 72). The tip angle 40 may be determined by Equation 1:

$$\text{Eq. 1: tip angle} = \frac{\tan^{-1}(1/\text{slope}_{left}) + \tan^{-1}(1/\text{slope}_{right})}{2}$$

After obtaining the tip angle measurement and returning to the procedure 54 of FIG. 8, a table is created (action block 74) listing the measured tip angle 40 for each deep feature 44 scanned in each direction (x and y) and the corresponding scanner head position for each tip angle measurement. The table may be stored in memory for future use (block 76). An example of such tables with example data therein are shown in Tables 1 and 2 below, for x and y scan directions, respectively:

TABLE 1

| x offset (µm) | tip angle (degrees) |
|---|---|
| −8 | 4.0 |
| −7 | 3.1 |
| −6 | 1.2 |
| −5 | 0.3 |
| −4 | 0.1 |
| −3 | −0.2 |
| −2 | −0.8 |
| −1 | −1.1 |
| 0 | −1.9 |
| 1 | −2.8 |
| 2 | −3.9 |
| 3 | −5.1 |
| 4 | −6.3 |
| 5 | −7.7 |
| 6 | −8.9 |

TABLE 2

| y offset (µm) | tip angle (degrees) |
|---|---|
| −4 | −5.2 |
| −3 | −4.3 |
| −2 | −3.4 |
| −1 | −2.7 |
| 0 | −1.9 |
| 1 | −0.2 |
| 2 | 0.9 |
| 3 | 1.9 |
| 4 | 2.9 |
| 5 | 4.2 |

Figure 14:
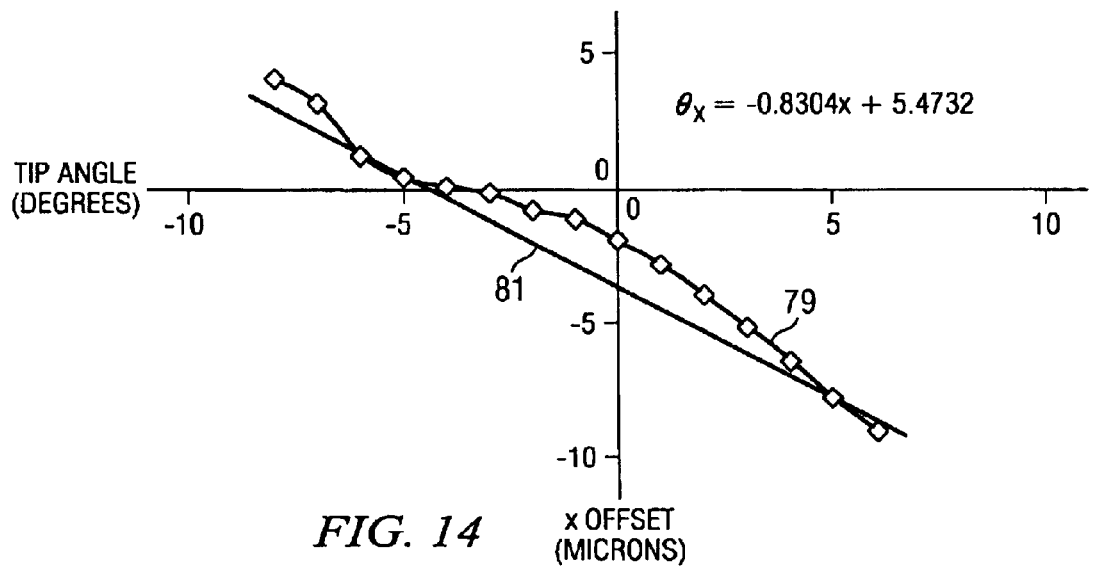
FIG. 14 is a plot for x offset position of the scanner head versus measured tip angle.
Figure 15:
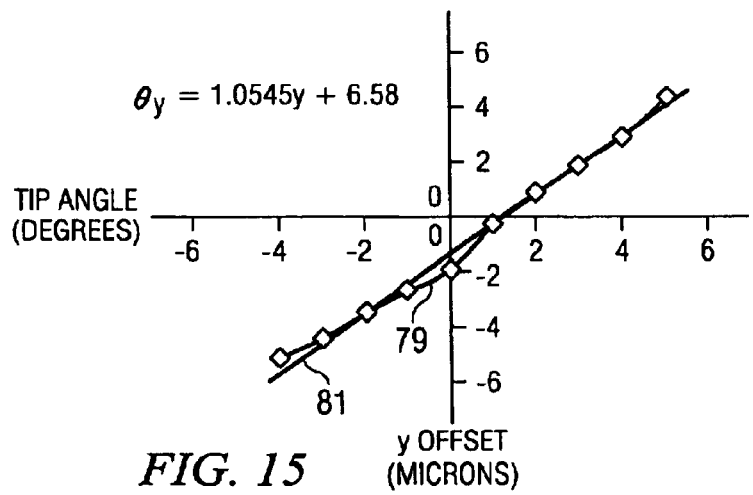
FIG. 15 is a plot for y offset position of the scanner head versus measured tip angle.

The measurements of x and y offset and tip angle in Tables 1 and 2 may be plotted, as shown in FIGS. 14 and 15. The tip angle measurement data from Table 1 is plotted in FIG. 14 for x offset position of the scanner head versus tip angle measurement along the x axis (block 78 in FIG. 8). A cubic spline curve 79 is shown fitted to the data points for illustration. A straight line 81 is fitted to the data points as a linear approximation (block 80 in FIG. 8). The linear function for the straight line 81 fitted to the data is used as the arc function for the x axis (i.e., the function that approximates the tip angle 40 as a function of scanner head movement in the x direction). Although less accurate than a polynomial curve fit, the linear line fit makes it easier to solve for either variable as needed (e.g., solving for x offset). However in other embodiments, a curve of any order may be fitted to the data points in the table to provide a more accurate arc function. After the arc function for the x direction is determined from the line fit (action block 82 in FIG. 8), it is stored for future use (block 84). Similarly for the direction, a plot is generated for the data in Table 2 for the y direction (action block 86 in FIG. 8), as shown in FIG. 15, a straight line 81 is fitted to the data points (action block 88), a linear function for the line 81 is determined and used as the arc function for the y direction (action block 90), and the arc function for the y direction is stored for future use (block 92).

After the arc functions are determined for the scanner head, return to the main flowchart shown in FIG. 7. The next determination is whether a new AFM tip has been installed (decision block 93). AFM tips have a much shorter life than the scanner head because they are delicate and often broken or worn during use. Each AFM tip from the same manufacturer and made to the same specifications may have a slightly different tip orientation (i.e., tip angle 40) when installed on the scanner head 30. Also, different types or makes of AFM tips may be used for different types of tests or for different sample types. Thus, to know the actual AFM tip orientation, the AFM tip should be calibrated.

Figure 16:
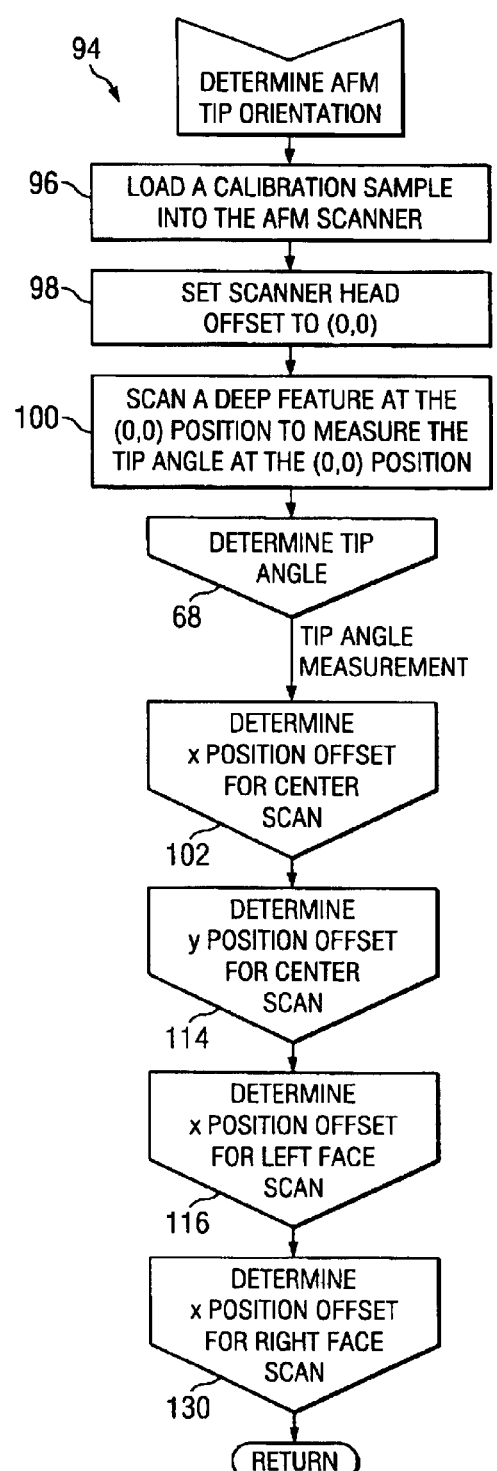
FIG. 16 is a flowchart for a process of determining the AFM tip orientation.

The process for determining the AFM tip orientation (block 94) is illustrated by the flowchart 94 in FIG. 16. If not already loaded, a calibration sample 55 (see e.g., FIGS. 9 and 10) is loaded into the AFM scanner machine 20 (action block 96). The calibration sample 55 used here may be the same calibration sample 55 used for the scanner head calibration (see e.g., FIGS. 9 and 10). Next, the scanner head offset is set to (0,0) (action block 98). At this position, the scanner head 30 is substantially straight and centered (see e.g., FIGS. 1b and 4a). A deep feature 44 in the sample 55 is scanned at this position to measure the tip angle 40 at the (0,0) scanner head position (action block 100). The tip angle measurement (block 68) is performed as described above with respect to the flowchart 68 in FIG. 12. The current tip angle 40 at the (0,0) position can then be used to determine the x position offset needed for a center scan (block 102) using the arc function for the x direction.

Figure 17:
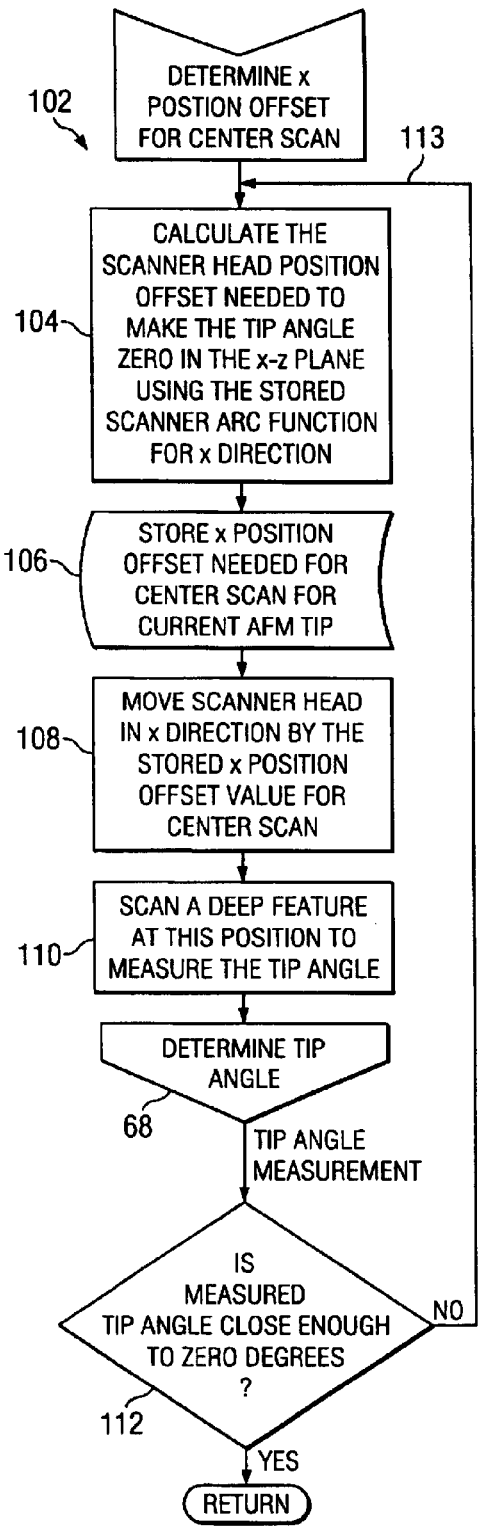
FIGS. 17–20 are flowcharts for processes of determining a scanner head offset for obtaining a particular AFM tip orientation.

FIG. 17 is a flowchart 102 showing the process for determining the x position offset for a center scan (i.e., a scan with the AFM tip 32 aligned with or parallel with the z axis for focusing on the central portion of the deep feature 44, see FIGS. 4a and 4 b). The scanner head position offset in the x direction needed to make the tip angle zero in the x-z plane is determined using the stored scanner arc function for the x direction (action block 104). The x position offset for a center scan for the current AFM tip is then stored for later use (block 106). Because the arc function is merely an approximation, the x offset value is next tested to determine if the actual tip angle 40 at this position is within tolerance. The scanner head is moved in the x direction by the stored x position offset for center scanning from the (0,0) position (action block 108). A deep feature 44 in the sample at this position is then scanned to measure the actual tip angle 40 (action block 110). Again the procedure 68 for determining tip angle 40 described above with respect to FIG. 12 is used to obtain a tip angle measurement at this scanner head position. The actual measured tip angle 40 should be zero or very near to zero. It is next determined whether the measured tip angle 40 is close enough to zero degrees within a predetermined tolerance range (decision block 112), which may vary per application. If the measured tip angle is close enough to zero (within tolerance), then the x offset is verified and retained, and this process is complete. If the measured tip angle is not within tolerance, then the process is repeated until the actual measured tip angle is close enough to zero degrees within tolerance for the x position scanner head offset (follow arrow 113). When repeated, the tip angle measurement at the prior x position offset is used to calculate a new x position offset value using the arc function. If needed, the arc function can be modified to provided a more accurate offset estimate. For example, using the stored data from the scanner head calibration (see e.g., Table 1 and FIG. 14), a different line or a curve may be fitted across data over a smaller scanner head position range about the prior x offset value to obtain another arc function to be used here. For example, looking at the data in Table 1, if the prior x offset is −3.5 microns, note that the linear line fit 81 is farther from the actual data points at a tip angle of zero in FIG. 14. To obtain a more accurate estimate of the x offset needed, another straight line (not shown) may be fitted to just a few data points near −3.5 microns (e.g., Table 1 data points (−3,−0.2), (−4,0.1), and (−5,0.3)). Or, a polynomial curve fit may be used also if more accuracy is needed. After repeating the procedure 102 of FIG. 17 and obtaining a satisfactory x offset value for a center scan, return to the procedure 94 of FIG. 16.

Figure 18:
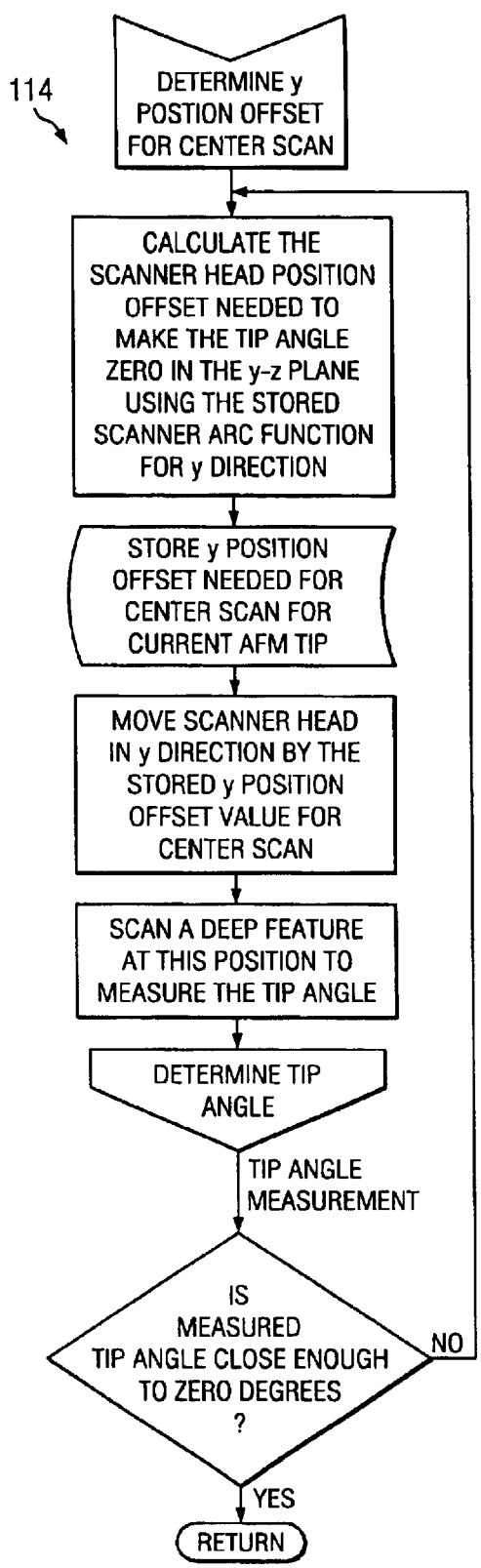

Next, the y position offset for a center scan is determined (block 114), as shown in FIG. 18, which is essentially the same as the procedure 102 of FIG. 17, except the arc function for the y direction is used (see e.g., Table 2 and FIG. 15). After determining the y position offset for a center scan (flowchart 114 in FIG. 18), return to the procedure 94 of FIG. 16 again. Note that the y offset procedure 114 may be performed before the x offset procedure 102 in other embodiments.

Figure 19:
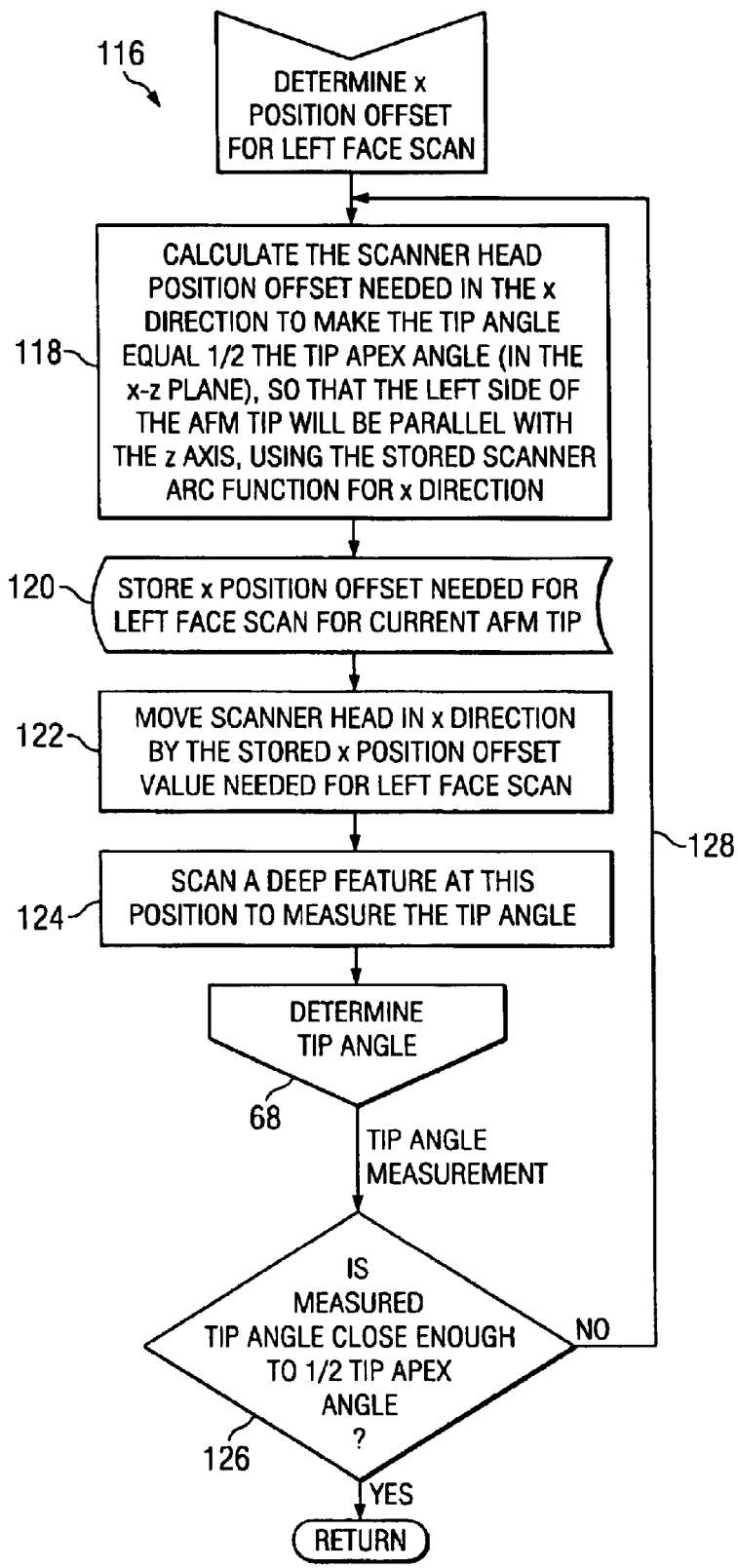

Next, the x position offset for a left face scan is determined (block 116) using a procedure outlined in the flowchart 116 of FIG. 19. The scanner head position offset needed in the x direction to make the tip angle equal to ½ the tip apex angle 45 is calculated using the arc function for the x direction (action block 118). The scanner head x position offset for a left scan is then stored for future use (block 120). This is a scanner head position where the AFM tip 32 is tilted to the left so that the left side of the AFM tip 32 is aligned with or parallel with the z axis. Most deep features 44 in semiconductor devices have vertical sidewalls, which is why this particular AFM tip tilt is chosen with the left side being vertically oriented (see e.g., FIGS. 5a and 5b). However, in other embodiments, the desired tip angle strived for may be a tip angle 40 where the left side of the AFM tip 32 is inverted relative to a left sidewall of a deep feature 44, or where the left side of the AFM tip 32 is parallel with a non-vertical or sloped left sidewall of a deep feature 44, for example. As in the procedures 102 and 114 of FIGS. 17 and 18, the estimated x offset position for the left face scan is verified by testing it. The scanner head is moved in the x direction by the stored x position offset value just calculated (action block 122). A deep feature 44 at this position is scanned to measure the actual tip angle (action block 124) using the procedure 68 described above and illustrated in FIG. 12. If the actual measured tip angle 40 is close enough to ½ the tip apex angle 45 within a predetermined tolerance range (which may vary per application), then the currently stored x position offset for left face scanning is satisfactory and retained (decision block 126). If the actual measured tip angle 40 is not close enough to ½ the tip apex angle 45 within tolerance, then the procedure is repeated (see arrow 128). As described above with regard to repeating the procedure 102 in FIG. 17, an additional arc function for the x direction over a limited range may need to be determined to provide a more accurate estimated of the x position offset for a left face scan. It should be noted that while performing the scans for verifying the left-face x position offset, the y position offset for setting the AFM tip vertical (tip angle 40 in y direction at zero) is preferably used to provide the best scan of the left face along the x direction. Likewise, the y position offset for center scanning is preferably used for all scans along the x direction to keep the AFM tip upright in the y direction and for obtaining better scan results.

Figure 20:
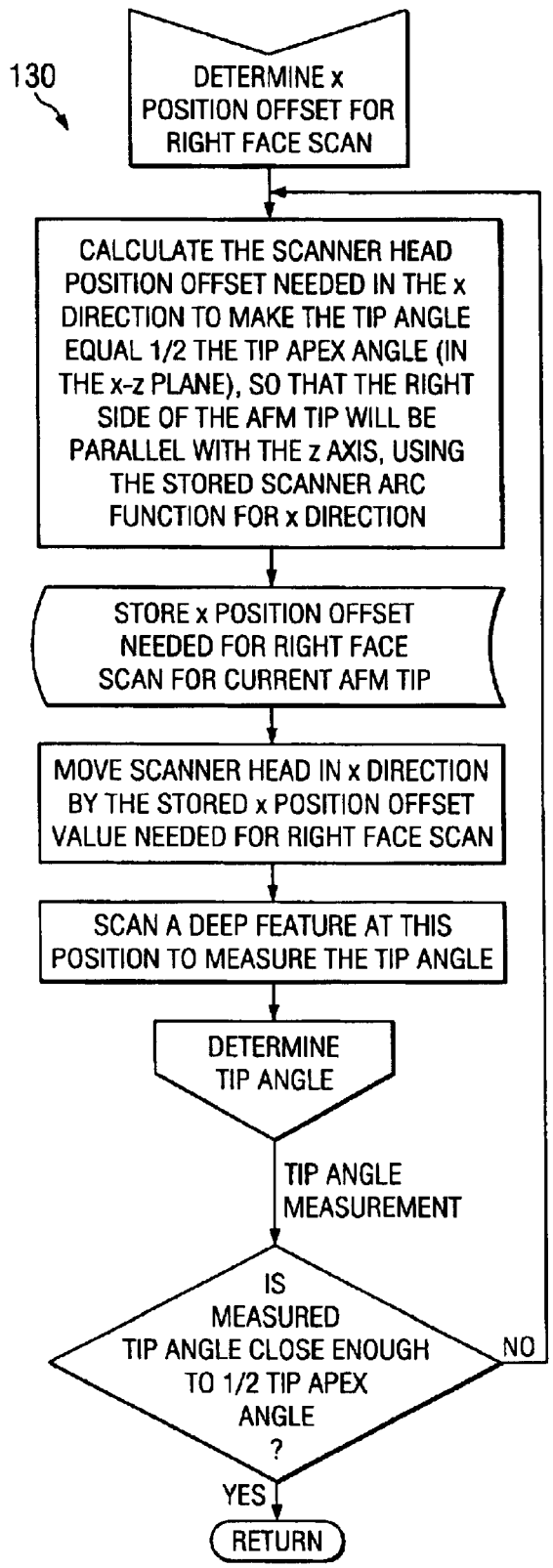

Returning to the procedure 94 of FIG. 16, the x position offset for a right face scan is next determined (block 130), as shown in FIG. 20, which is essentially the same as the procedure 116 of FIG. 19, except the tilt direction is opposite. After determining the x position offset for a right face scan (flowchart 130 in FIG. 20), return to the procedure 94 of FIG. 16 again. Note that the x offset procedure 130 for right face scanning may be performed before the x offset procedure 116 for left face scanning in other embodiments. Also, in other embodiments the procedures 102, 114, 116, and 118 may be performed in any other order. It may be preferable to perform the y position offset for center scanning first because this y offset value will be useful in the other procedures 102, 116, and 130 to get better scans in the x direction. All of the procedures 102, 114, 116, and 118 may be repeated if needed or if desire to increase the accuracy of the offset values determined.

Returning to the main procedure flowchart in FIG. 7, the scanner head 30 and the AFM tip 32 are calibrated and ready for performing AFM scans on actual manufacturing samples. The x and y offsets for the scanner head position are now known and will enable the user to know and control the desired AFM tip orientation for different scans, which should provide better AFM depth measurements and/or better AFM images.

Next in FIG. 7, the desired deep feature analysis type is selected (decision block 132). In this embodiment, three types of deep feature analysis procedures or scanning procedures are available. The lower and center depth measurement procedure 134 provides a single depth measurement for a deep feature 44 while avoiding damage to the AFM tip 32. A variant of this procedure is described in a related U.S. patent application by the same inventor having Ser. No. 10/218,449. The partial deep feature image procedure 136 provides a cross-section AFM image of a deep feature that focuses on a particular portion (e.g., center, left, or right portion) and provides an accurate portrayal of the actual deep feature for the portion of focus. The complete deep feature image procedure 138 provides a composite cross-section AFM image of several deep features 44 to provide an accurate portrayal of the actual deep feature profile for the deep features 44 of that test sample (assuming most all of the deep features 44 on that sample are substantially identical, which is the typical case in semiconductor manufacturing). The procedure(s) used for repeated testing during manufacturing may be set as operational defaults for an automated process or they may be selected by a user manually in response to a software prompt, for example.

Figure 21:
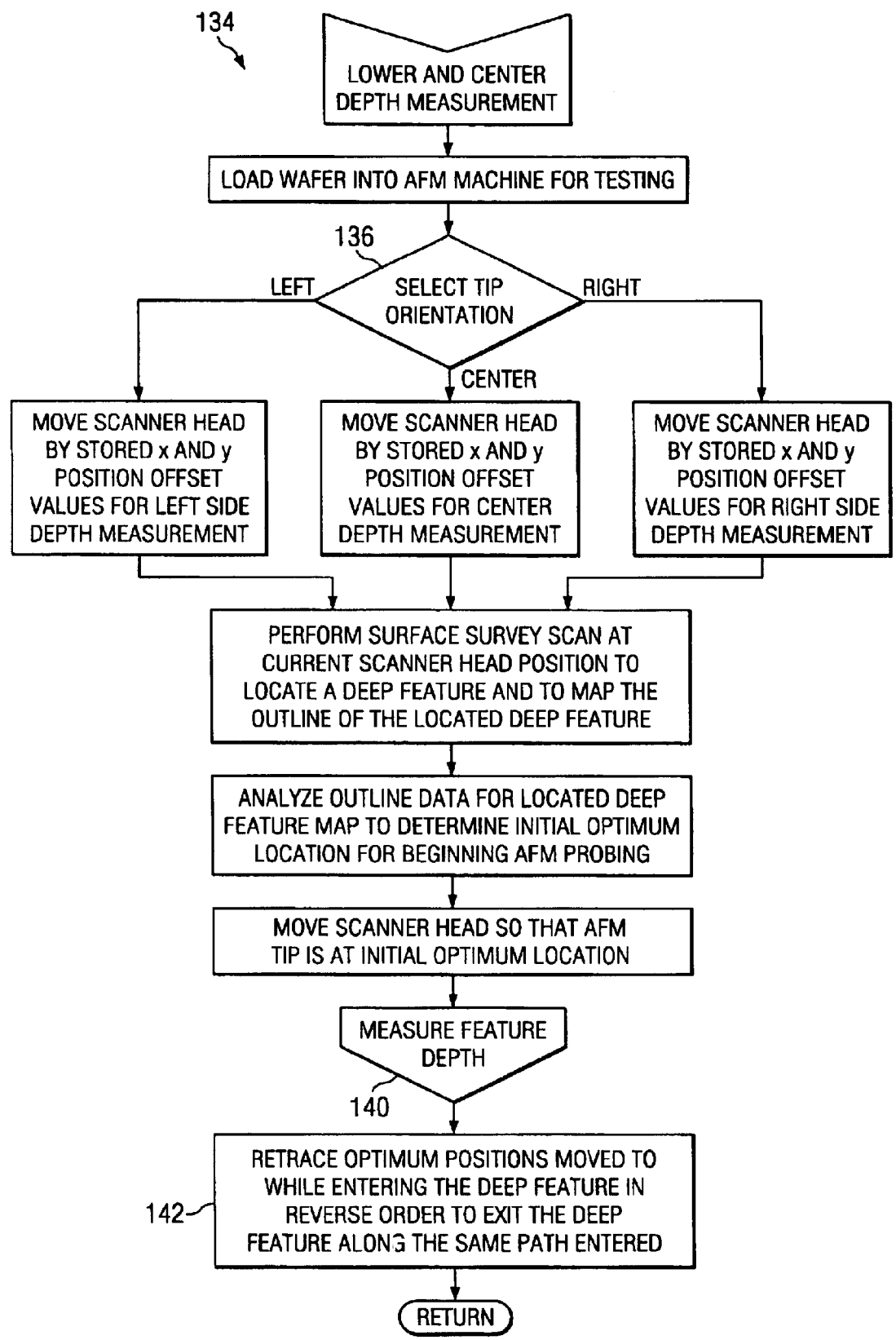
FIGS. 21–22 are flowcharts for a lower and center depth measurement process.
Figure 22:
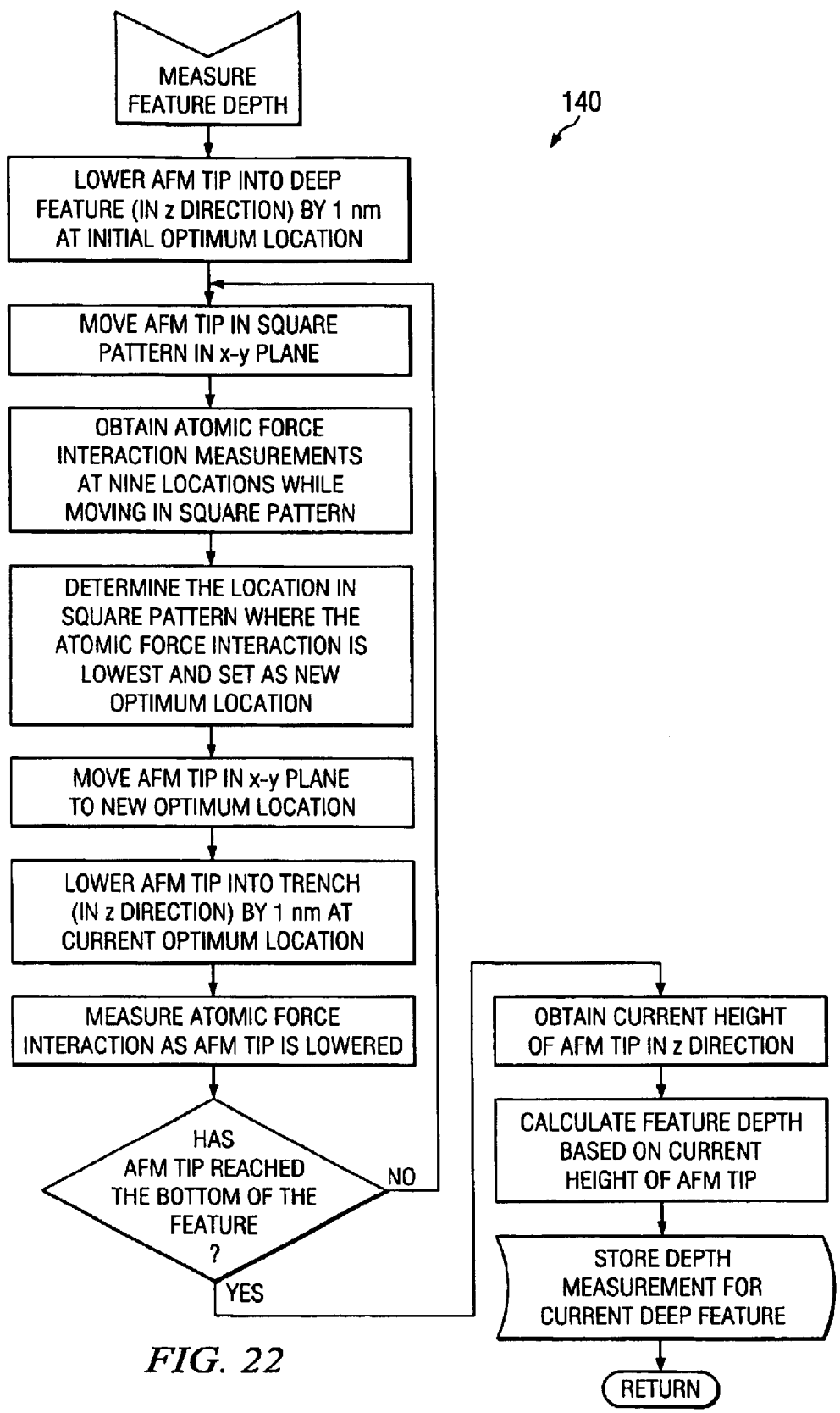

The lower and center depth measurement procedure 134 for this embodiment is illustrated by a flowchart 134 of FIG. 21. The lower and center depth measurement may be used to measure the depth of a deep feature at the center portion (e.g., maximum depth within a divot), or at a left or right portion (e.g., depth at a bottom left or right corner, outside of the divot) (see decision block 136 in FIG. 21). The lower and center procedure attempts to lower the AFM tip to a maximum depth while avoiding contact with the sidewalls to reduce tip wear and breakage. At each increment of downward movement into the deep feature (in z direction), an optimum location is sought where the AFM forces exerted on the AFM tip are lower or minimized for a given area in the current x-y plane (see procedure 140 shown in FIG. 22). After reaching the bottom and the depth measurement is obtained, the AFM tip may be retracted along the same path of optimum locations at each x-y plane traced along the z-direction by which the AFM tip entered the deep feature (action block 142).

Figure 23:
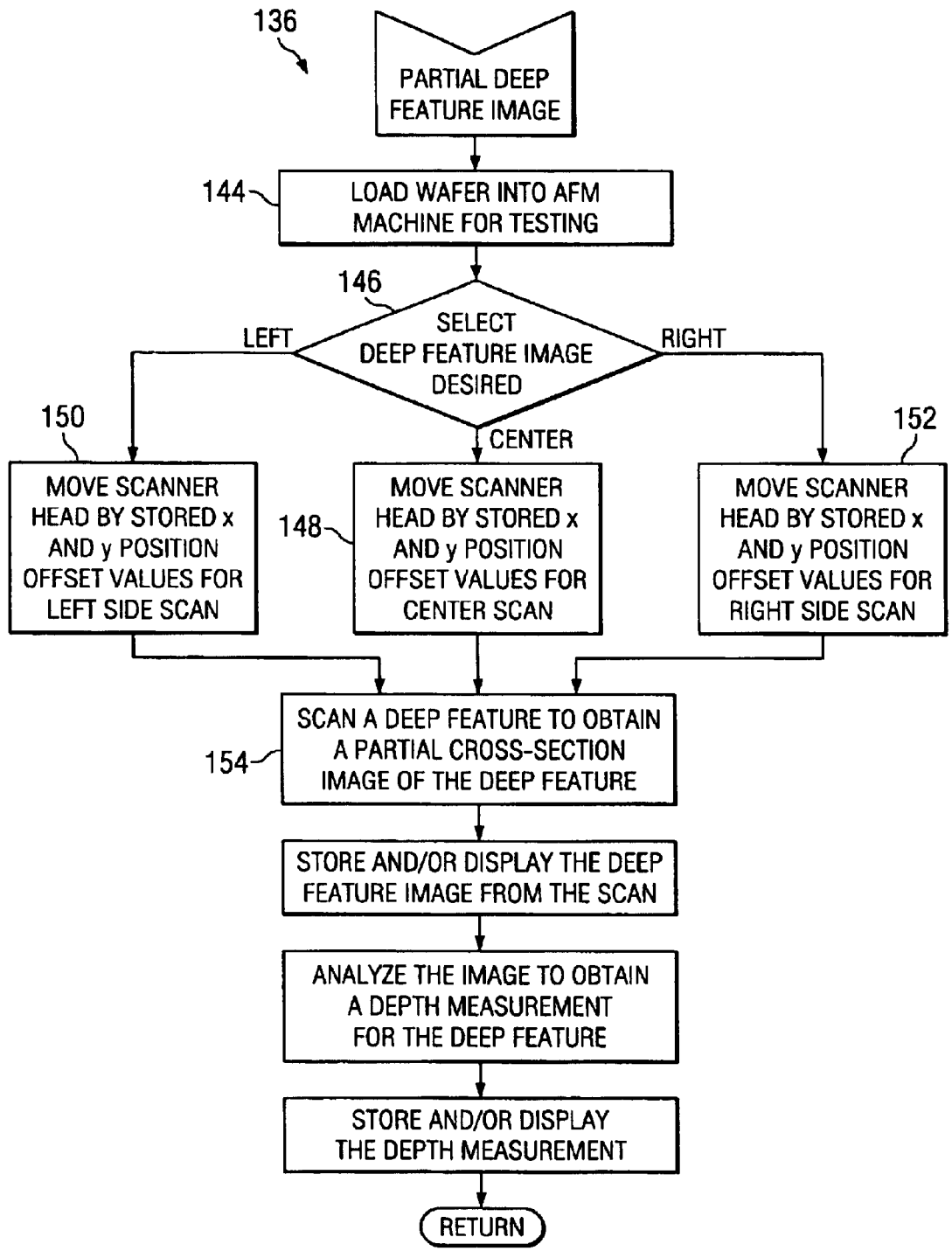
FIG. 23 is a flowchart for a process of obtaining a partial deep feature image.
Figure 24:
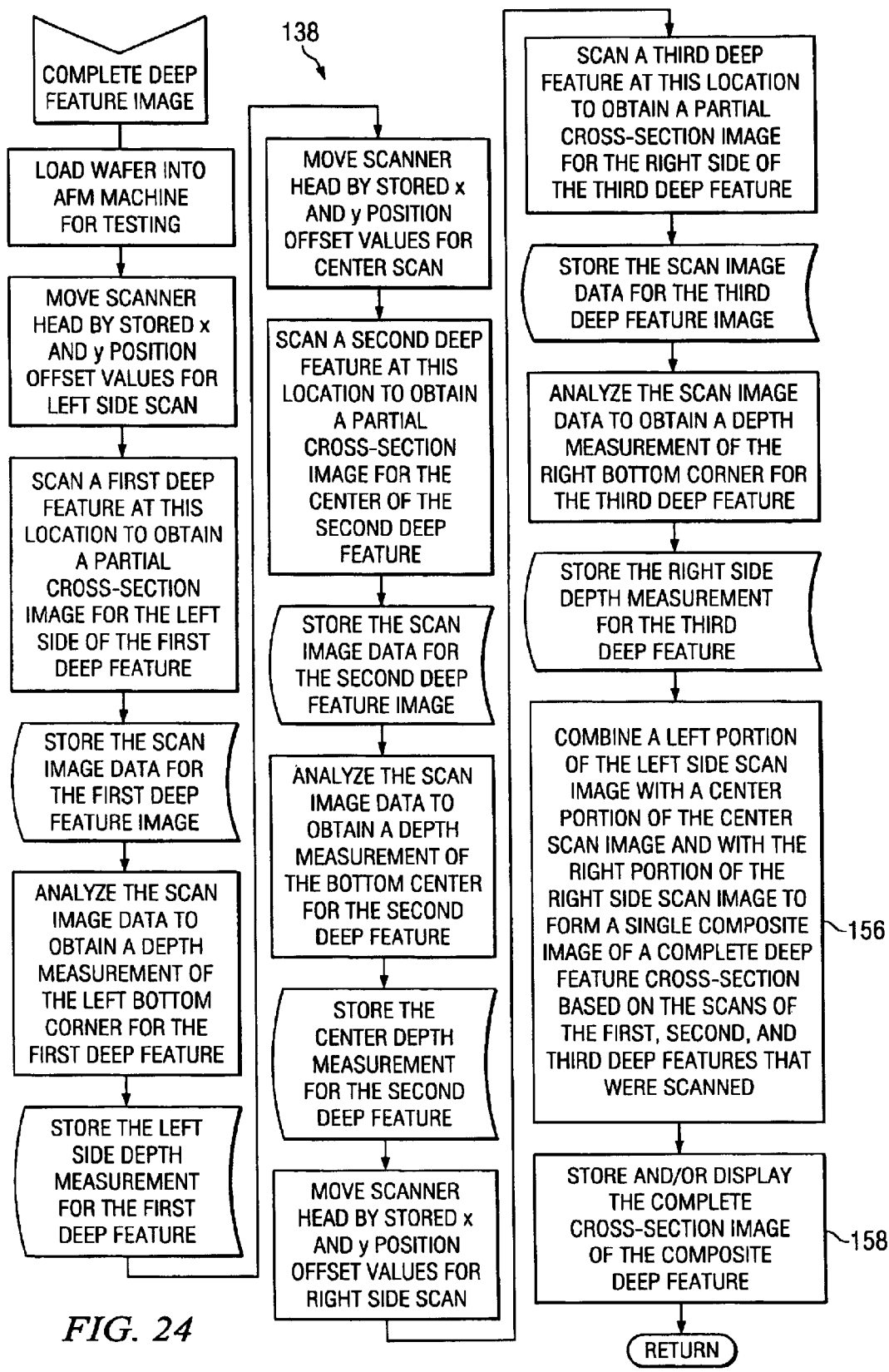
FIG. 24 is a flowchart for a process of obtaining a complete composite deep feature image.

The partial deep feature image procedure 136 for this embodiment is illustrated by the flowchart 136 of FIG. 23. When a wafer or other sample is loaded into the AFM machine for testing (action block 144), the deep feature image desired is selected (decision block 146). The selection may be performed manually be a user (e.g., when prompted by the software) or it may be selected automatically according to settings programmed or pre-selected in the software (e.g., for repeated production testing). If a center scan is selected, the scanner head is moved by the stored x and y position offset values for a center scan (block 148). If a left or right scan is selected, the scanner head is moved by the stored x and y position offset values for a left or right scan, respectively (blocks 150 and 152). After positioning the scanner head to get the desired AFM tip orientation, which is known and controllable using the calibration information (arc functions and tip angle measurements), a deep feature at the current position is scanned to obtain an AFM image (action block 154). The scan may be performed using a tapping/dipping mode, for example, with the AFM traversing along the x direction while the AFM tip probes in the z-direction to obtain a cross-section profile of the deep feature, as shown in FIGS. 4a–6b. A center scan may provide an AFM image as shown in FIG. 4b. A left or right scan may provide an AFM image as shown in FIGS. 5b or 6b, respectively. A partial deep feature measurement may be useful when an AFM image of only a specific portion of the deep feature is desired or needed accurately, such as a bottom left corner depth or image as shown in FIG. 5b.

Figure 25:
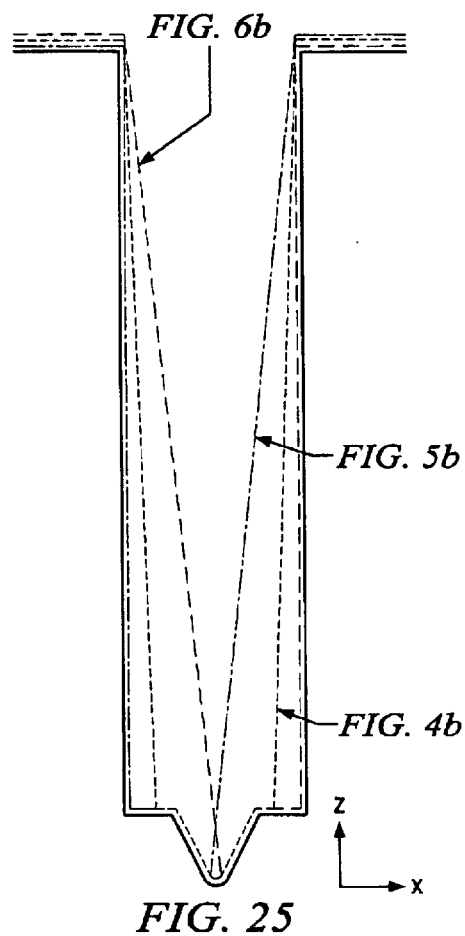
FIG. 25 shows a composite AFM image formed from of three different AFM scan images and representing an actual cross-section profile for a deep feature.

If a complete AFM image of the deep feature structure is desired, the complete deep feature image procedure 138 for this embodiment may be used. The complete deep feature image procedure 138 is illustrated by the flowchart 138 of FIG. 24. Because an AFM tip will often only provide an accurate portrayal of a portion of the actual deep feature structure, as described with respect to FIGS. 4a–6b, a composite image may be used to provide a complete deep feature image. Thus, in the complete deep feature image procedure 138 shown in FIG. 24, center, left, and right scans are performed. Although the order of performing a left side scan first, a center scan second, and a right scan third is shown in the FIG. 24 for this embodiment, the scanning order may be different for other embodiments. Different deep features will be scanned for the left, center, and right scans because the scanner head will be at different positions in the x-y plane for each scan to obtain the desired or targeted tip orientations. However, for most semiconductor wafers during the production of a semiconductor device, a series of deep features for a given wafer are virtually identical due to the extreme controls and uniformity of the semiconductor processing steps across the entire wafer. For example, a wafer during the fabrication of DRAM chips, or a structure designed to test the fabrication of DRAM or other chips may have millions or billions of identical deep features formed in the wafer. Thus, a deep feature at one point on the wafer will most likely be identical in size and structure to any other deep feature in the proximity. Hence, any of the deep features scanned at any position should be representative of the other deep features. Following the assumption that the deep features are uniform for a given region on the wafer, a composite image is formed by combining the accurate portrayal portions of the AFM images from the left, center, and right scans to form a complete image of a representative deep feature (action block 156). For example, combining the left side of FIG. 5b with the central portion of FIG. 4b, and with the right portion of FIG. 6b, may provide a complete composite AFM image as shown in FIG. 25 that is representative of the actual cross-section profile for the deep features on a given wafer or sample. Such image may then be stored for future statistical analysis and quality control and/or displayed immediately for a user to observe (block 158). Returning to the main process in FIG. 7, the main process is concluded.

Note that the subroutines 54, 68, 94, 102, 114, 116, 130, 134, 136, 138, and 140 maybe broken up in different ways than that shown in FIGS. 8, 12, and 16–24, or there may be no subroutines (i.e., all combined into one main program). With the benefit of this disclosure, one of ordinary skill in art will likely realize many variations of the present invention that may form many other embodiments of the present invention.

Although the preferred embodiment described above is in the context of deep features formed in a semiconductor wafer during the production of a semiconductor device (e.g., DRAM memory cells), embodiments of the present invention may be used in other fields for testing and imaging other types of devices or structures.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the processes, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of calibrating an scanner head of an atomic force microscopy (AFM) machine comprising:

loading a calibration sample into the AFM machine;

scanning deep features formed in the sample with an AFM tip attached to the scanner head along a first line in a first direction;

determining a first tip angle measurement for the AFM tip relative to the sample along the first line for at least two of the deep features scanned along the first line;

scanning deep features formed in the sample with the AFM tip along a second line in a second direction, wherein the second direction differs from the first direction;

determining a second tip angle measurement for the AFM tip relative to the sample along the second line for at least two of the deep features scanned along the second line;

determining a first function corresponding to the first tip angle measurements versus position along the first line;

determining a second function corresponding to the second tip angle measurements versus position along the second line; and storing the first and second functions as the arc functions for the scanner head.

2. The method of claim 1, wherein the first direction corresponds to an x axis and the second direction corresponds to a y axis, and the first direction is perpendicular to the second direction.

3. The method of claim 1, wherein the first line crosses the second line to form a cross-shaped scan pattern.

4. The method of claim 1, further comprising:

fitting a first line to a plot of data for the first tip angle measurements versus the scanner head position along the first line, wherein the first function is the mathematical equation representing the first fitted line.

5. The method of claim 1, further comprising:

fitting a first curve to a plot of data for the first tip angle measurements versus the scanner head position along the first line, wherein the first function is the mathematical equation representing the first fitted curve.

6. The method of claim 1, wherein the scanning is performed using a tapping mode.

7. A method measuring an actual tip angle for an atomic force microscopy (AFM) tip comprising:

providing a sample having a deep feature formed therein, wherein the deep feature has vertical sidewalls;

scanning the deep feature with the AFM tip;

analyzing a cross-section image of deep feature scan data to determine a slope of a left sidewall of the cross-section image;

analyzing the cross-section image of deep feature scan data to determine a slope of a right sidewall of the cross-section image; and determining the actual tip angle of the AFM tip at a position where the deep feature was scanned based on the left and right sidewall slopes.

8. The method of claim 7, wherein the scanning is performed using a tapping mode.

* * * * *